March 19, 1957    J. K. HUTCHENS ET AL    2,785,907
STRUCTURE FOR MOUNTING DIRIGIBLE WHEELS
Filed Nov. 17, 1953    3 Sheets-Sheet 1

INVENTORS
J. K. HUTCHENS,
JAMES A. McNEECE
BY
ATTORNEYS

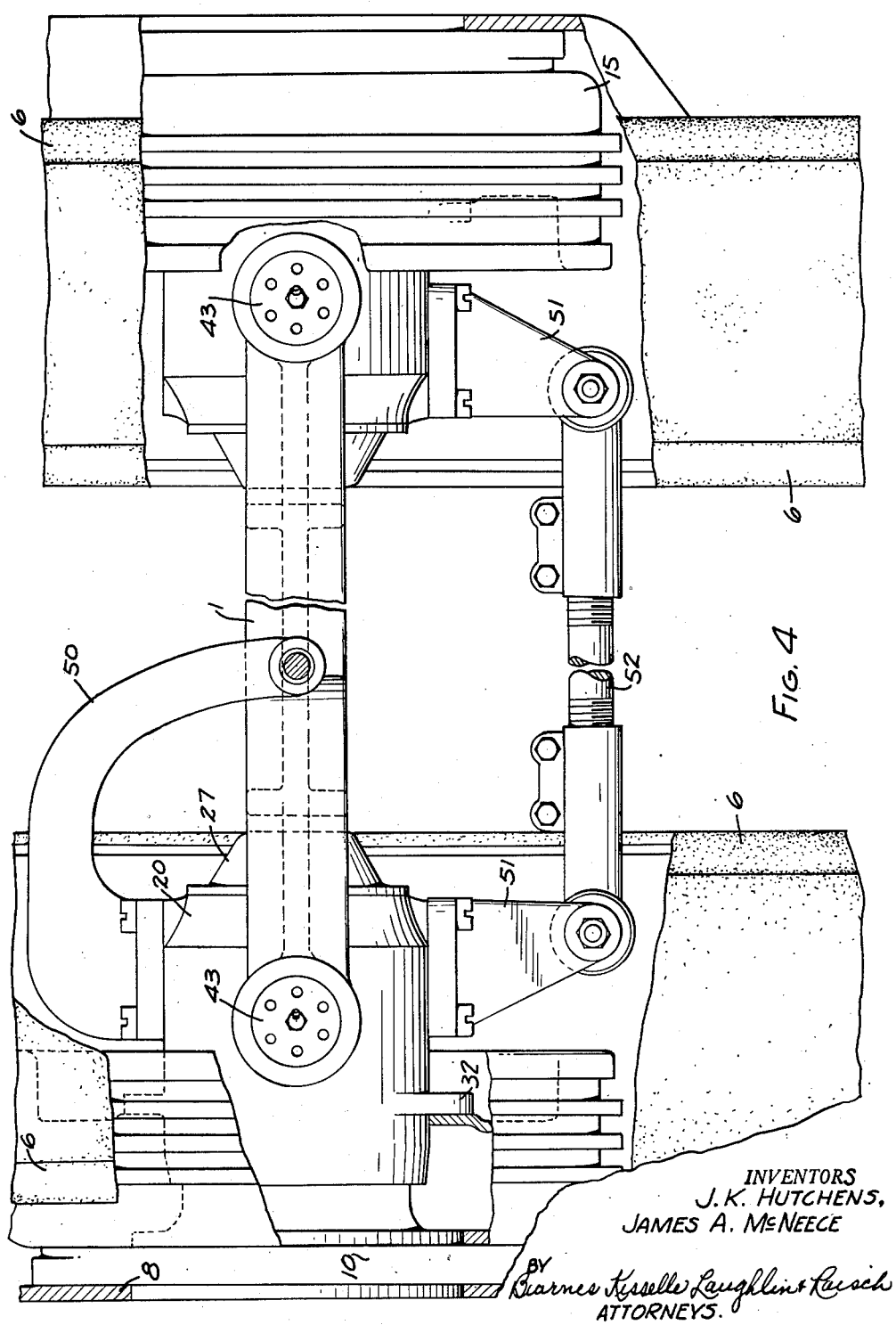

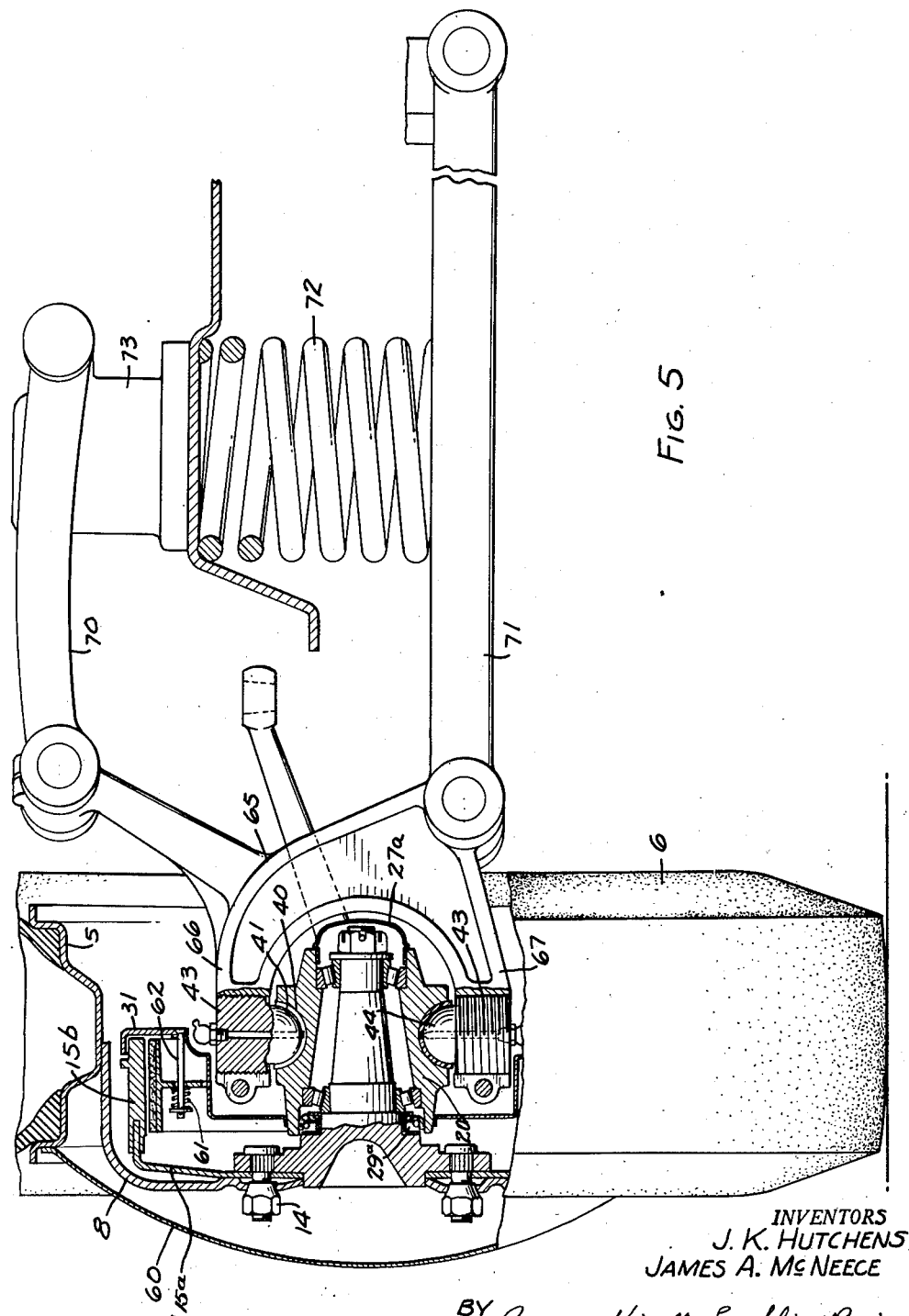

United States Patent Office 2,785,907
Patented Mar. 19, 1957

2,785,907

STRUCTURE FOR MOUNTING DIRIGIBLE WHEELS

J. K. Hutchens, St. Joseph, Mich., and James A. McNeece, Portland, Oreg.

Application November 17, 1953, Serial No. 392,698

6 Claims. (Cl. 280—96.3)

This invention relates to the mounting of dirigible wheels such, for example, as the front wheels of automotive vehicles.

The general objects of the invention are to provide a dirigible wheel mounting especially useful in automotive vehicles which will make for a safe vehicle operation. The mounting is such that the vehicle can be held under control and will continue movement substantially in a straight path even though a pneumatic tire on one of the wheels is subjected to blow out, or the casing is broken, or suddenly becomes flat for any other reason; or if one wheel goes off the road and strikes a soft shoulder or loose earth, or if the brakes are unequal even to the extent of one brake exerting a grabbing action while the brake on the opposite wheel is released. Moreover, the mounting provides for easier steering of the vehicle. Further, the mounting provides for much greater life of the tires.

The structure quite universally in use today is one wherein the dirigible wheel is mounted on a spindle which projects laterally from the king pin which provides the axis on which the wheel turns for steering purposes. In other words, the wheel is mounted to one side of the axis on which it turns for steering purposes. Accordingly, numerous forces and torques are delivered to the king pin bearings which causes wear and when one wheel is subjected to a condition, such as a flat tire, soft earth or soft shoulder, or a grabbing brake, the forces encountered tend to swerve the vehicle and must be overcome, if they can be overcome, by the steering mechanism. In such a structure, the two front steering wheels are usually set so that they have a "toe-in" relationship, and the king pin axis is disposed at an angle to provide the condition known as camber, and also the condition known as king pin inclination, in order to give the structure stability. These things result in the scrubbing of the tires on the highway with resultant undue wear. These conditions are aggravated when the mechanism gets out of adjustment and the bearings are worn.

In accordance with the present invention the steering axis is disposed near and preferably substantially on the center plane of the wheel. The wheels are mounted in a straight forward position without "toe-in" and without camber although the factor of caster is embodied, this being accomplished by positioning the steering axis so that the upper portion is slightly rearward relative to the lower portion as is well known to those versed in the art. A form of construction which embodies a ball and socket mounting is employed and so arranged on or near the center plane of the wheel that forces emanating from the wheel by reason of a blow out or grabbing brakes, or the striking of a soft shoulder along the road, or other loose dirt, sand or gravel, are locally resolved so that the wheel continues to run in a straight forward direction.

Structures for carrying out the invention are shown in the accompanying drawings:

Fig. 4 is a plan view illustrating the steering assembly.

Fig. 5 is a view similar to Fig. 1 illustrating the dirigible mounting of the present invention with an independently sprung wheel.

Figures 1, 2, 3:
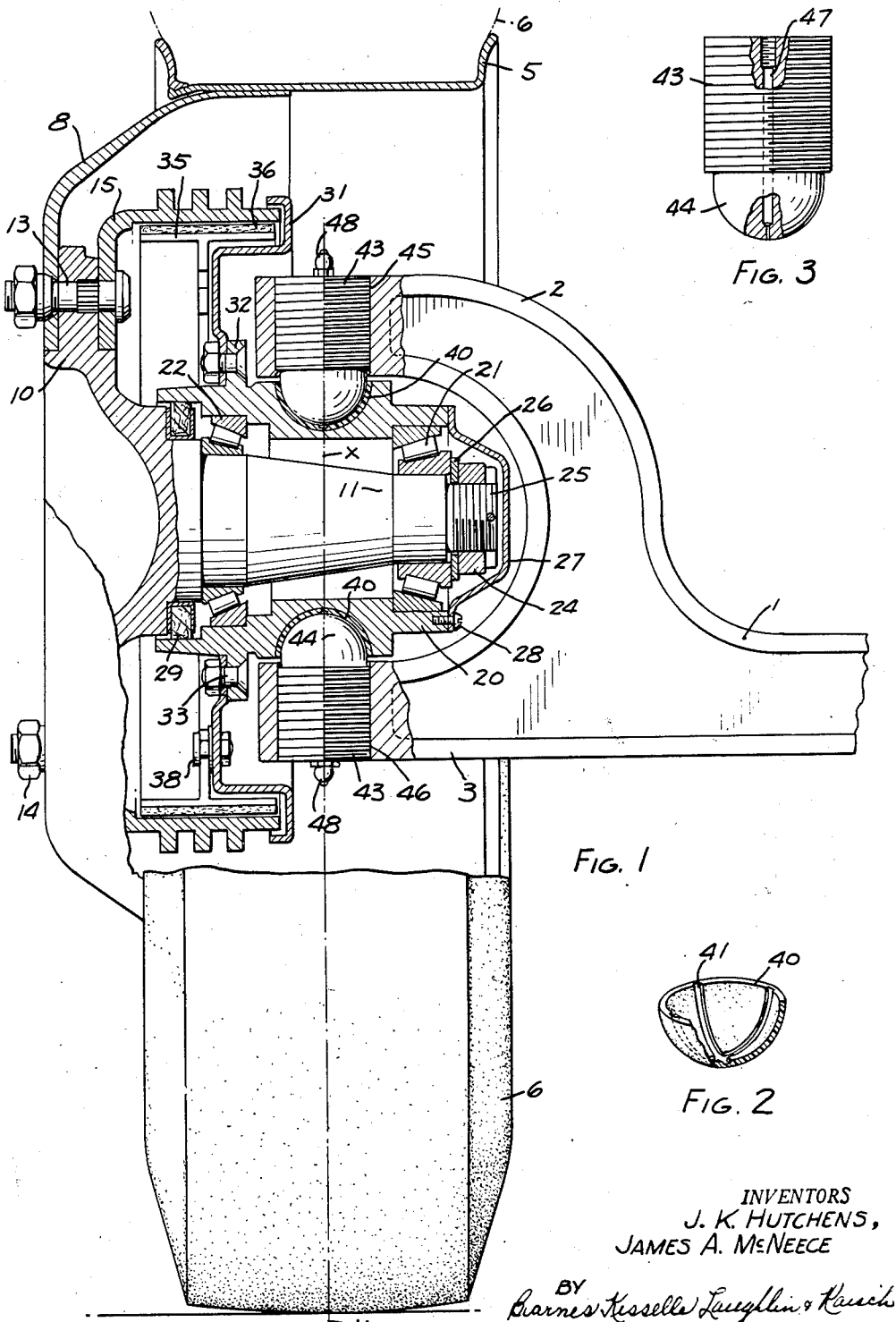
Fig. 1 is a view partly in section illustrating a wheel mounting with an axle construction, such as is used in some vehicles, particularly trucks and tractors.
Fig. 2 is a view illustrating a partly spherical bearing cup.
Fig. 3 is a view illustrating a bearing member for cooperation with the cup.

In Fig. 1 an axle, such as the front axle of a vehicle, is shown at 1, and it is divided or forked to provide an upper arm or part 2 and a lower arm or part 3. The wheel rim 5 is for receiving the usual pneumatic tire 6 and the wheel rim is carried by a wheel body or wheel proper 8 as shown herein as in the form of a dished disc.

The wheel body 8 may be detachably connected to the outer hub portion 10 of a spindle 11 by means of studs 13 and nuts 14, and the studs 13 may also hold a brake drum 15.

It will be noted that the spindle 11 extends inwardly from the central portion of the wheel 8 and into the central part of the rim 5.

There is a member which may be termed an inner hub 20 which is mounted within the forks of the axle as will presently be seen, and the spindle 11 is journalled therein as by means of suitable anti-friction bearings 21 and 22. The spindle may be secured in position by a nut 24 mounted on the screw threaded end 25 of the spindle with an intervening washer 26, and the nut may be covered by a hub cap 27 held by screws 28. A grease seal is shown at 29.

The inner hub 20 carries a back plate 31 which may be secured to a flange 32 on the hub as by means of bolts 33, and inside of the brake drum is located a brake shoe 35 with suitable facings 36. It will be understood that there is usually two brake shoes within the brake drum and they are anchored to the inner hub 20 by means as shown at 38.

The inner hub member 20 is mounted between the axle parts 2 and 3 so that it may turn for steering the wheel. For this purpose the inner hub 20 is provided with an upper and a lower recess each for receiving partly spherical hollow bearing member 40. This bearing member, as shown in Fig. 2 is completely hemispherical although it may not be fully hemispherical and it is preferably formed with grooves 41 which serve to retain lubricant. The cooperating bearings may be identical, each preferably in the form of a member having a screw threaded body 43 with a partly spherical male bearing member 44. One of such bearing members is screw threaded as at 45 in the axle portion 2 and the other one as at 46 in the axle portion 3. The upwardly and downwardly extending axis of these ball type bearings is shown at $x$ which is located within the planes of opposite edges of the rim and preferably substantially on the center plane of the wheel. Each member 43 may have a passage 47 therethrough screw threaded at one end for receiving a lubricant fitting 48 so that lubricant may be introduced into the bearing parts.

As shown in Fig. 4, there is a wheel mounting on each end of the axle 1 and secured to one of the hubs 20 is a steering arm 50 to be attached to suitable steering mechanism. Attached to each hub member 20 is an arm 51 and the arms are interconnected by a suitable tie rod 52. It will thus be understood how movements of the steering arm 50 causes like steering action of both hubs 20 and the wheels mounted thereon.

With this construction, the axis $x$ may be set in a true vertical position as it is viewed in Fig. 1; also the hubs may be set, as Fig. 4 is viewed, so that the spindle flanges outer hub 10 extend truly fore and aft and thus the wheels have no camber factor or "toe-in" factor. However, the caster factor is preferably employed, this being the expedient of positioning the turning axis so that the upper part thereof is slightly rearward of the lower part thereof and this may be done by shimming the axle. Thus the wheels will incline inwardly when steered to cause the vehicle to turn.

It will be noted from this construction that various forces delivered to the mounting by the wheel are locally resolved in the wheel mounting. When a tire strikes some loose earth or a soft shoulder the forces are directly rearwardly on the wheel and these forces are delivered into the partly spherical mountings on the center of the wheel so that there is no tendency to turn the wheel on its axis $x$. Moreover, in the case of a flat tire as may result from a blow out, or in case of the grabbing of a brake, the forces are delivered squarely on the dirigible axis of the wheel with no tendency to turn it on that axis. Thus the wheel tends, at all times, to run in a true direction which is straight forward, if the wheel is positioned for straight forward movement of the vehicle at the time the forces are delivered thereto.

This construction, as will be seen, embodies a relatively few basic parts. The assembly can easily be made. In making the assembly the bearings 40 may be placed in the hub 20 and after the hub is located the members 43 are screwed down into position. Moreover with this construction, the wheels will stay in alignment indefinitely unless there is some bending or distortion of parts.

It has been found that the material of which the bearings 40 are made is important, particularly if long life and long period of proper alignment is desired. The male bearing 41 may be of steel and the cup bearing may be of a suitable plastic substance, ductile iron, bronze, Babbitt, an impregnated material, or a suitable metal alloy. Preferably, however, the cup bearing is of a plastic substance known as nylon. The nylon bearing, in conjunction with the steel bearing, provides an admirable situation. Tests have shown no measurable wear in thousands of miles of use, even without lubrication. In making the assembly with a nylon cup bearing positioned both above and below, the tightness with which the members 43 are engaged in the cups is not particularly critical; the adjustment should be snug but not binding. Obviously, most of the vehicle weight comes on the upper bearing but even after many miles of testing no discernible difference in wear could be seen where the nylon bearing was employed. In any event, if the structure becomes loose in use it is only necessary to tighten the mounting by adjusting the members 43 on their screw threads. The partly spherical construction of the joints remain as partly spherical and when tightened, if and when tightening is needed, the members again fit each other with a nicety.

The structure can, of course, be employed with wheels which are independently sprung, as shown in Fig. 5. In Fig. 5 many of the parts are the same as those heretofore described and are identified by the same reference character with the addition of the letter $a$. Fig. 5 indicates a construction such as may be used in a passenger vehicle and the wheel may have a wheel cover 60 to give it the desired ornamental appearance. The brake drum is shown as residing in the body part 15a and a separate rim 15b. Also this view shows a spring 61 and a member 62 for supporting and locating the brake shoe. In this form instead of an axle there is a form of yoke 65 with an upper part 66 and a lower part 67 for the mounting of the hub 20 and the yoke is mounted on an upper pivoted arm 70 and a lower pivoted arm 71 with the weight supported by a coil spring 72 while a shock absorbing structure 73 is shown associated with the arm 70. In this form the seal 29a and the cap 27a are slightly different from those shown in Fig. 1 but this is inconsequential insofar as the invention is concerned.

We claim:

1. In a mounting for a dirigible wheel of a vehicle, supporting means on the vehicle having an upper arm and a lower arm with the arms spaced apart, an inner hub positioned between the arms, a wheel spindle journaled in said hub, a partly spherical recess in the hub, a member adjustably mounted in the upper arm having a partly spherical male member fitting into the recess in the hub to form a ball and socket type joint, another partly spherical recess in the hub, a member adjustably mounted in the lower arm having a partly spherical male member fitting into the other recess in the hub to form a ball and socket type joint, said joints having a common axis extending in a radial direction substantially on the center plane of the wheel upon which the hub may turn for steering purposes, each joint having a concavo-convex lining between the recess and the male member thereof and formed of a material having a low coefficient of friction, said arms having clearance within said wheel, and said joint members being adjustable to the extent necessary to withdraw said male members from said recesses and permit endwise removal of said hub and spindle from said arms as a unit.

2. In combination, a vehicle having a dirigible wheel, a spindle for the dirigible wheel, supporting means on the vehicle having an upper arm and a lower arm with the arms spaced apart, an inner hub positioned between the arms adapted to receive the spindle of the wheel, two oppositely positioned partly spherical recesses in the hub, a liner of material having a low coefficient of friction positioned in each recess and each forming a partly spherical bearing recess, a member screw threaded in each of the upper and lower arms and each having a partly spherical male member fitting in one of the partly spherical recesses in the hub, thereby forming ball and socket type joints, said joints having a common axis extending in a radial direction substantially in the center plane of the wheel upon which the hub may turn, said screw-threaded members and arms having clearance within said wheel to accommodate withdrawal of said members outwardly of said arms to release said male members from said recesses.

3. In combination, a vehicle having a dirigible wheel, supporting means on the vehicle having an upper arm and a lower arm with the arms spaced apart, an inner hub positioned between the arms, a recess in the hub, a second recess in the hub positioned diametrically opposite the first, a hollow partly spherical nylon bearing member having lubricating grooves and adapted to be seated in each recess, each arm having an internally threaded opening therein, a bearing member having an integrally formed screw threaded body and a partly spherical metal bearing portion threaded into the upper arm with the bearing portion seated in one hollow bearing member, a second bearing member having an integrally formed screw threaded body and a partly spherical metal bearing portion threaded into the lower arm with the bearing portion seated in the other hollow bearing member, thereby forming ball and socket type joints, said part-spherical bearing portion having a radius smaller than said arm openings, and a wheel spindle journalled in the hub and extending outwardly therefrom away from the supporting means and carried by said wheel, said arms being positioned within said wheel with clearance whereby said bearing members may be withdrawn endwise from said hub recesses to release said wheel and hub as a unit.

4. The combination with a dirigible wheel structure for a vehicle comprising supporting means on the vehicle having upper and lower arms spaced relative to each other, an inner hub positioned between the arms, a spindle arranged to rotate within the inner hub and provided with an outer hub having a radial flange, a brake drum engaging one side of the flange, a wheel body engaging the other side of the flange and provided with an axial portion for supporting a rim for a tire, common means extending through the flange, wheel body and drum for securing them together, to form a unitary wheel assembly the inner hub having diametrically opposite recesses therein, a liner in each recess, a male bearing member carried by and outwardly removable from each of the upper and lower arms and having a reduced inner end portion projecting inwardly of each arm and each interfitting with a recess in the hub, the recesses and reduced portions of said male bearing members being partly spherical and of substantial surface area to form ball and socket type joints and said joints having a common axis on a line substantially in the center plane of said wheel upon which the inner hub may turn the arms extending into said wheel body with clearance radially of said wheel sufficient to permit withdrawal of said bearing members from said hub recesses to the extent necessary to permit axial withdrawal of said unitary wheel assembly from said supporting means.

5. A mounting structure for a dirigible wheel of a vehicle comprising supporting means on the vehicle having spaced upper and lower arms, an inner hub positioned between said arms, a spindle having a part positioned outwardly of said arms, a wheel attached to said part and having a rim encircling said arms with clearance, brake means including parts carried by said wheel and said inner hub respectively, said spindle extending inwardly into the hub, bearing means journalling the spindle in the hub, means detachably connecting said hub and spindle, a partly spherical joint between the hub and the upper arm including a partly spherical recess in the hub and a partly spherical male member on the upper arm, a partly spherical joint between the hub and the lower arm including an inverted partly spherical recess in the hub and a partly spherical male member on the lower arm, each joint having a concavo-convex liner between the recess and male member thereof and formed of material having a low coefficient of friction, said joints being positioned on a common axis extending in a radial direction and located substantially on the center plane of said wheel, said male members being removably connected to said arms by movement radially outward relative to said wheel as accommodated by the clearance between the arms and wheel to withdraw said part-spherical members from said part-spherical sockets and permit disconnection of said hub, spindle, wheel and brake from said supporting means as a unit in a direction parallel to the axis of said spindle.

6. A mounting structure for a dirigible wheel of a vehicle comprising supporting means on the vehicle having spaced upper and lower arms, an inner hub positioned between said arms, a spindle having a part positioned outwardly of said arms, a wheel attached to said part and having a rim encircling said arms with clearance, said spindle extending inwardly into the hub, bearing means journalling the spindle in the hub, means detachably connecting said hub and spindle, a partly spherical joint between the hub and the upper arm including a partly spherical recess in the hub and a partly spherical male member carried by and radially removable from the upper arm, a partly spherical joint between the hub and the lower arm including an inverted partly spherical recess in the hub and a partly spherical male member carried by and radially removable from the lower arm, each joint having a concavo-convex liner between the recess and male member thereof and formed of material having a low coefficient of friction, said joints being positioned on a common axis extending in a radial direction and located substantially on the center plane of said wheel, said arms having a clearance in said wheel sufficient to accommodate withdrawal of said part-spherical members from said part-spherical sockets to the extent necessary to permit disconnection of said hub, spindle and wheel from said supporting means as a unit in a direction parallel to the axis of said spindle.

References Cited in the file of this patent

UNITED STATES PATENTS

| | | |
|---|---|---|
| 1,926,549 | Metz | Sept. 12, 1933 |
| 2,044,490 | Zook | June 16, 1936 |
| 2,259,813 | Garnett et al. | Oct. 21, 1941 |
| 2,521,335 | Booth | Sept. 5, 1950 |
| 2,666,677 | Miller | Jan. 19, 1954 |